J. V. BEEKMAN.
FRICTION DRUM.
APPLICATION FILED APR. 23, 1909.
976,841.
Patented Nov. 29, 1910.
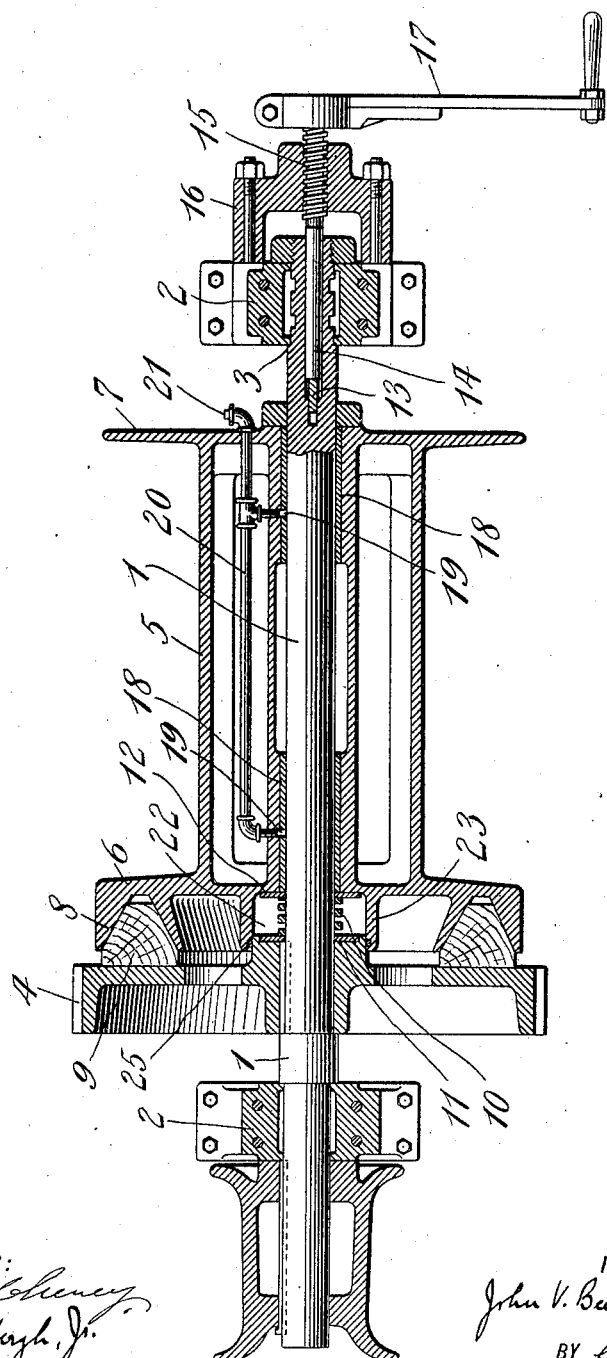
WITNESSES:
INVENTOR
John V. Beekman
BY
ATTORNEYS

UNITED STATES PATENT OFFICE.

JOHN V. BEEKMAN, OF PLAINFIELD, NEW JERSEY, ASSIGNOR TO LIDGERWOOD MANUFACTURING COMPANY, A CORPORATION OF NEW YORK.

FRICTION-DRUM.

976,841.  Specification of Letters Patent.  Patented Nov. 29, 1910.

Application filed April 23, 1909. Serial No. 491,749.

*To all whom it may concern:*

Be it known that I, JOHN V. BEEKMAN, a citizen of the United States, and a resident of Plainfield, Union county, and State of New Jersey, have invented a new and useful Improvement in Friction-Drums, of which the following is a specification.

The management of the lubricating oil for friction rope drums has always been a difficult problem and one which has, to a very large extent, baffled all attempts at successful solution up to the present time. One of the great evils which has been generally recognized as an important element of this problem has been the hitherto uncontrollable tendency of the lubricating oil to saturate or cover the friction surfaces so as to entirely change their coefficients of friction and many attempts have been made to overcome this difficulty by selecting peculiar materials for the construction of such friction surfaces but without very much success. By my invention, I overcome this difficulty independently of the selection of the material or form of the friction surfaces.

In the accompanying drawings, I have shown a horizontal section of a friction rope drum containing my invention; the caps of the bearings being removed.

1 is the shaft turning in bearings 2 and containing shoulders 3 to resist end thrust.

4 is a spur or plate wheel keyed to the shaft and which is driven from any suitable source of power.

5 is the drum barrel revolubly mounted on the shaft.

6, 7 are the drum flanges.

8 is the friction member carried by the drum. 9 is the friction member fixed to the spur or plate wheel. In the accompanying drawings, these friction members are shown as of the ordinary V-ring form with the male member upon the spur or plate wheel made of wood. But I do not wish to limit myself either to this relative arrangement or to this form or to this material.

10 is the usual spiral spring interposed between the steel washers 11 and 12 lying, respectively, against the hubs of the drum and spur or plate wheel. The function of this spiral spring is to separate the friction surfaces when not shoved together by the action of the usual cross key 13, the central longitudinal pin 14, screw 15, fixed nut 16 and hand lever 17.

18 is the usual brass bushing of the drum containing the hole 19 for the admission of oil. 20 is the usual oil pipe leading from the end of the drum to this hole and provided with the cap 21 for closing the pipe when filled with oil. The pipe 20 being filled with lubricating oil, it works its way from the hole 19 under the bushing 18 into the space 22 between the washers 11 and 12. This space by my invention is made substantially an oil receptacle or chamber wherein the oil may accumulate and wherein it is restrained from radial escape.

23 is a cylindrical flange cast or otherwise secured to the hub of the drum at substantially the distance shown from the shaft. This cylindrical flange extends to and beyond the face of the hub 24 of the spur or plate wheel so as to overlap the same, as shown. At the overlap, the flange 23 is grooved and in the groove is placed the flexible packing ring 25 of felt or other material suitable for permitting rotary and longitudinal motion between the flange 23 and the hub 24 without permitting the leakage of the oil between those parts.

In the drawing, the friction surfaces are shown as set in contact, but when released the backward movement of the drum away from the spur or plate wheel is so slight that the packing ring 25 still overlaps the hub and still continues to seal the joint between the flange 23 and the hub against the leakage of the oil. As the drum revolves upon the shaft, the oil works from the pipe 20 under the bushing 18 into the oil reservoir chamber or receptacle 22, but by reason of the closure afforded by the flange 23 and the packing ring 25, the oil accumulates in this reservoir 22 and is entirely withheld from escaping onto the friction surfaces while at the same time its accumulation affords better conditions for lubrication than have heretofore existed.

Having thus described my invention, what I claim is:

1. In combination, a shaft, a drum revoluble thereon, a driving member, interposed friction surfaces operable to connect and disconnect the drum and driving member by movement of one of the latter relative to the other longitudinally of the shaft, a drum bushing, an oil pipe supplying oil within the same, a circular flange bridging the space between said drum and said driving member, and movable revolubly and longitudinally upon a projection of one of the same whether the friction surfaces are engaged or disengaged to form a closed chamber into which the space between the drum and shaft opens, whereby oil oozing from within the said bushing is restrained within said chamber from radial escape.

2. In combination a shaft, a drum on the shaft, a driving element on the shaft, said element having an annular extension, friction surfaces on the drum and element to couple the same, means for sliding one of said elements longitudinally of the shaft to engage and disengage said friction surfaces, an annular extension on the drum slidably and revolubly engaging the annular extension on the driving element throughout the relative movement of the drum and driving element, said annular extensions engaging and constituting a closed chamber irrespective of the position of the drum and driving element, and means for supplying lubricant between one of said elements and said shaft.

In testimony whereof, I have hereunto signed my name in the presence of two subscribing witnesses.

JOHN V. BEEKMAN.

Witnesses:
JAMES G. LIDGERWOOD,
FRANKLIN D. HOOPER.